United States Patent
Glück

[11] Patent Number: 5,865,282
[45] Date of Patent: Feb. 2, 1999

[54] SYSTEM COMPRISING AT LEAST TWO CONDUCTOR RAILS JOINED BY AN ELECTRICAL CONDUCTOR

[75] Inventor: Joachim Glück, Schramberg-Sulgen, Germany

[73] Assignee: Alusuisse Technology & Management Ltd., Switzerland

[21] Appl. No.: 796,018

[22] Filed: Feb. 5, 1997

[30] Foreign Application Priority Data

Feb. 28, 1996 [DE] Germany ............ 196 07 460.6
Mar. 8, 1996 [DE] Germany ............ 196 07 006.7

[51] Int. Cl.[6] .............................................. B60M 7/00
[52] U.S. Cl. ........................... 191/22 DM; 238/14.3; 238/14.05; 238/230
[58] Field of Search ......................... 191/22 R, 29 R, 191/29 DM, 22 DM; 238/14.05, 14.4, 14.5, 14.6, 14.7, 14.14, 148, 150, 151, 171, 184, 185, 186, 230, 231, 232, 234, 236, 237, 238, 239

[56] References Cited

U.S. PATENT DOCUMENTS

| 967,414 | 8/1910 | McCarty | 238/236 |
|---|---|---|---|
| 1,132,461 | 3/1915 | Dimm | 238/236 |
| 4,219,108 | 8/1980 | Doring | 191/29 R |
| 5,224,575 | 7/1993 | Plichta . | |

FOREIGN PATENT DOCUMENTS

| 768391 | 5/1934 | France | 191/29 |
|---|---|---|---|
| 285003 | 11/1990 | Germany . | |
| 504038 | 12/1954 | Italy | 238/236 |
| 627062 | 10/1961 | Italy | 238/232 |
| 23980 | 2/1979 | Japan | 191/29 DM |
| 252033 | 12/1985 | Japan | 191/22 DM |

*Primary Examiner*—Mark Tuan Le
*Attorney, Agent, or Firm*—Bachman & LaPointe, P.C.

[57] ABSTRACT

In a system comprising at least two conductor rails, in particular composite sections each featuring a rail-shaped load-bearing section and at least one strip-shaped section of another metal of greater wear resistance joined to the matrix of the load-bearing section, the ends of pairs of neighbouring rails are connected electrically by at least one conductor of variable length. The ends of the conductor rails are bent out of the central axis (M) of the conductor rail and led parallel to and a distance (n) displaced from that axis, such that the strip-shaped section of one conductor rail end is approximately aligned with the strip-shaped section of the other conductor rail away from the rail end; the conductor rail ends are joined in such a manner that they can move with respect to each other along the axial direction.

14 Claims, 4 Drawing Sheets

SYSTEM COMPRISING AT LEAST TWO CONDUCTOR RAILS JOINED BY AN ELECTRICAL CONDUCTOR

BACKGROUND OF THE INVENTION

The invention relates to a system comprising at least two conductor rails, in particular composite sections each featuring a rail-shaped load-bearing section and at least one strip-shaped section of another metal exhibiting greater wear resistance, in which the ends of pairs of neighboring rails are connected electrically by at least one conductor of variable length. The said load-bearing section comprises a base and, at about its middle, an integral flange.

Composite sections made up of two section components are known from DE-24 32 541. These composites are manufactured by creating the load-bearing section in an extrusion process in which an ingot is pressed through the shape-giving opening of a die for light weight metals; at the same time the strip-shaped section passes through the die opening or shape-giving cross-section parallel to the longitudinal axis of the die.

In systems using such conductor rails, possibly experiencing changes in length due to fluctuating operating and ambient temperatures, the connecting regions of neighboring conductor rails should compensate for these changes in length and should, as much as possible, ensure that a sliding power-transfer shoe or power collector has uninterrupted contact in the region where both conductor rails are joined. To that end it has been proposed e.g. to cut the conductor rail ends at an acute angle and to join them by fish-plates. Conductor rails are also arranged parallel to each other at their ends and with the possibility of commutating the power transfer shoe. The known solutions involve technically difficult installation of a plurality of special accessories, at the same time requiring more space.

SUMMARY OF THE INVENTION

In view of this state of the art the object of the present invention is to develop for such connecting regions in conductor rails, especially for composite sections having a T-shaped cross-section, a compact construction which meets the requirements for installing normal conductor rails without requiring any special accessories.

That objective is achieved by way of the invention.

According to the invention the ends of the conductor rails are bent out of line of their central axis and run parallel to that axis a distance from it such that the strip section of one rail end is approximately in line with the strip section of the other rail away from the end of that rail; in order to compensate for changes in length along the direction of the axis, the conductor rail ends are joined in such a manner that they are moveable along their axis.

As a result, after installation, the strip-shaped section on the main length of one conductor rail is aligned with the strip-shaped section length on the displaced rail end of the other conductor rail; the ends of both conductor rails run parallel to each other.

When employing a conductor rail of T-shaped cross-section featuring a load-bearing section having a base part and an integral flange at about the middle of that base, a strip-shaped section is, according to a further feature of the invention, embedded in the head of the flange along its longitudinal axis forming a sliding contact plane there; the end region of the rail is displaced sideways by an amount corresponding to approximately half the cross-sectional width of the rail flange; the length of rail base where half of the base cross-section has been removed should extend beyond the bent part of the rail to the rail end face.

It has been found favorable to lay two rail ends together along the lengths which have had half of the base removed, the sideways displacement of the ends being in opposite directions.

In order to simplify the joining process, the rail end is provided with a longitudinal slit in its flange running parallel to the flange axis and situated near the end face of the conductor rail; also in line with that slit is a hole for a bolt or the like rod-shaped connecting element; the slit runs preferably near and parallel to the base of the conductor rail; the hole should be situated between the slit and the end face of the conductor rail.

This enables two extreme settings to be obtained. Set at maximum length, the connection is such that the bolt or the like in the hole in one rail lies in the slit in the neighboring rail at the end of the slit near the end face of that rail.

Set at the shortest length, the connection is such that the bolt or the likes in the hole in one rail lies in the slit in the neighbouring rail at the end of the slit away from the end face of that rail.

Electrical contact is maintained by adaptable conductors; both rail ends are joined by a flexible electrical conductor, such as extendible strips, cables or the like. The preferred strip-like conductor is joined to the rail end by a sliding transverse facility.

Within the scope of the invention is, advantageously, the use of a composite section in which at least one profiled strip is embedded in the light weight metal approximately perpendicular or inclined to the sliding contact plane. According to another feature of the invention a profiled strip runs in the longitudinal axis of the composite section and a narrow face of the profiled strip touches the contact plane, thus forming the sliding contact face of the composite section.

Also feasible is a composite section with a profiled strip on both sides of and a distance from the longitudinal axis.

The result is a compact, robust design of rail transition with very short length of ready-made extension joint and relatively large degree of extension available. At the same time permanent mechanical and electrical contact is assured between the collector shoe and the conductor rail system as the shoe passes over the extension joint; losses in power and arcing are reliably avoided.

BRIEF DESCRIPTION OF DRAWINGS

Further advantages, features and details of the invention are revealed in the following description of preferred exemplified embodiments and with the aid of the drawings which show in FIG. 1: end view of a composite section featuring base, flange and embedded therein a strip-shaped section making up a conductor rail.

DETAILED DESCRIPTION OF PREFERRED EMBODIMENTS

Figure 1:
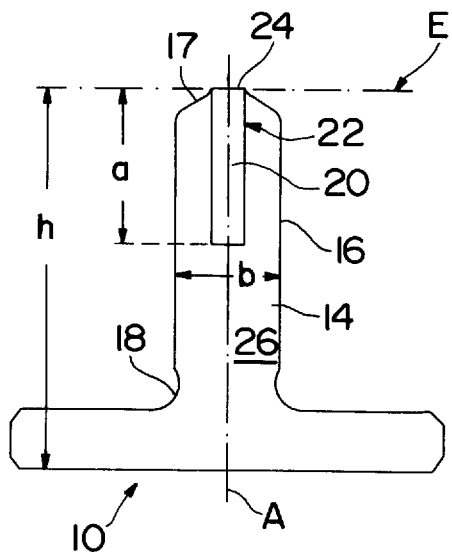

A conductor rail 10 comprises a T-shaped load-bearing section of light weight metal featuring a base 12 with an integral flange 14 at about the middle thereof; at the free end of the flange 14 a head 16 features embedded in it, along the flange axis A, a strip-shaped section 20 made of another metal of high wear resistance, in particular a steel strip. At the transition from the base 12 to the flange 14 on both sides of the flange 14 is a groove-shaped neck 18.

The flat strip 20, the height a of which parallel to the axis A is slightly shorter than height h of the conductor rail 10, is embedded during extrusion in a load-bearing section constituting a light metal matrix, in particular a matrix of an aluminum alloy, and is joined to that matrix forming intermetallics at least at its broad faces or sides 22 and, if desired by an interlocking action due to corrugations, depressions or openings in the flat strip 20 which are not shown here. One of the long faces 24 of the strip-shaped section lies between two inclined faces 17 on the rail head 16 the top of which stands free and defines a so called sliding contact plane E for a power collector or sliding contact shoe which is not shown here.

Figure 2:
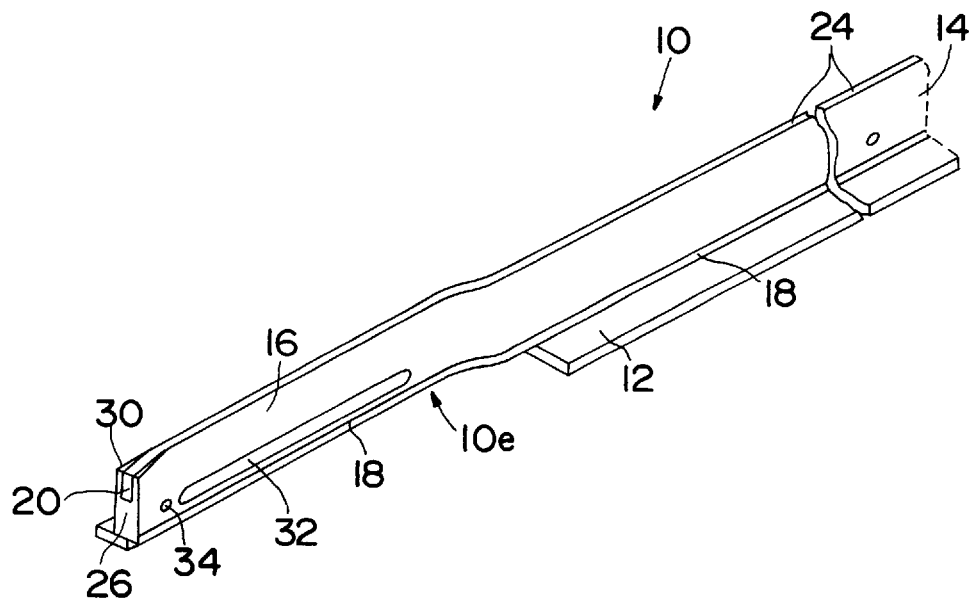
FIG. 2: a perspective view of the conductor rail after bending an end region to provide an expandable joint.

Changes in length can occur along the longitudinal axis M of the conductor rail. In order to be able to compensate for this at the connection to a further conductor rail 10, the right half of the conductor rail base 12 in FIGS. 1 and 2 is removed up to a length e from the end face 26. Over a shorter length f from the end face 26 the rail of reduced cross-section is bent out of the longitudinal axis M of the rail 10, this in order to be able to make another, still shorter length i run, as end length $10_e$, parallel to that longitudinal axis M. For better understanding, the longitudinal axis there is indicated by $M_1$.

Figure 3:
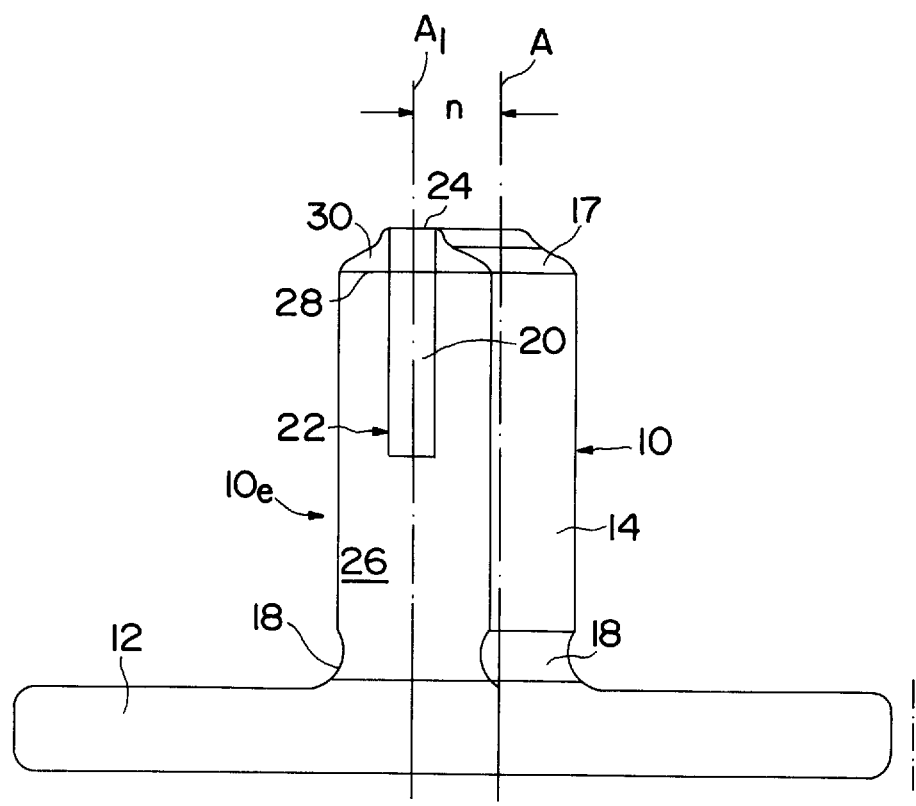
FIG. 3: enlarged view of the end shown in FIG. 1 showing the partly removed base and displacement of the end part away from the longitudinal axis of the rail.

The amount n to which the flange axis $A_1$ of length $10_e$ is displaced from the axis A of the main part of the conductor rail 10 is indicated in FIG. 3; this represents slightly more than half the width b of the flange 14. The sideways displaced end face 26 is shortened down to the lower ends of the flanking faces 17; as a result a top surface 28 is produced which runs parallel to the rail base 12 and from there as, inclined face 30 up to the sliding contact plane E on the rail head 16.

In the end length $10_e$, slightly above the neck 18 and running parallel to it, is a longitudinal opening in the form of a slit 32, and between that and the end face 26 a through hole 34 which lies on the longitudinal axis of the slit 32 i.e. as a kind of extension thereof.

Figure 4:
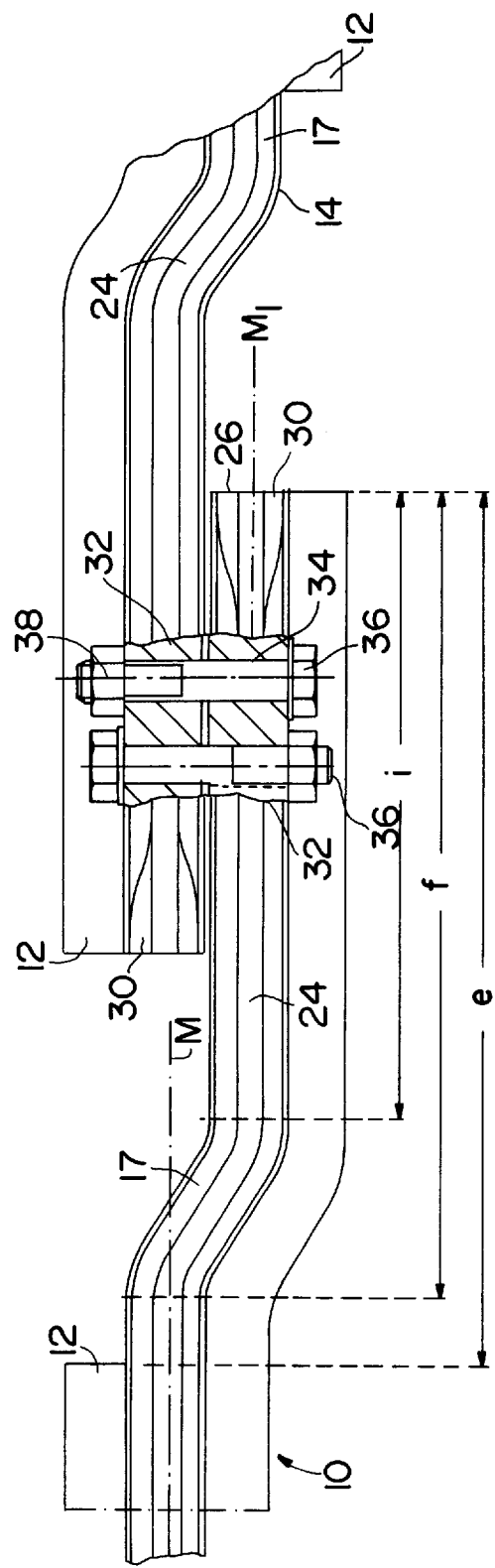
FIG. 4: plan view of an expandable joint between a pair of conductor rails.

FIG. 4 shows two conductor rail ends $10_e$ joined together by bolts 36; these bolts 36 are tensed in opposing directions through their respective holes 34, a neighboring slit 32 and nuts 38 with underlying washers.

Figure 5:
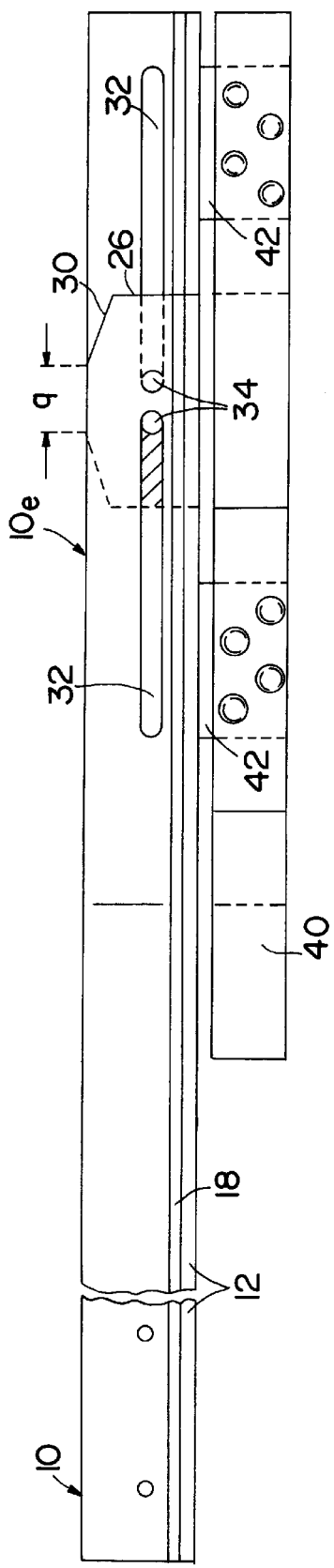
FIGS. 5–6: side elevation of the expandable joint region in two different positions.

The conductor rail ends $10_e$ shown in FIG. 5 are fitted together at the extreme length of the expandable joint i.e. the two rail ends overlap very little; the bolts are situated at the ends of the slits 32 near the end face 26 of the rails. The end faces 26 are a distance q apart, the length of overlap q providing constant electrical contact between the rail system 10/10 and the collector shoe.

Figure 6:
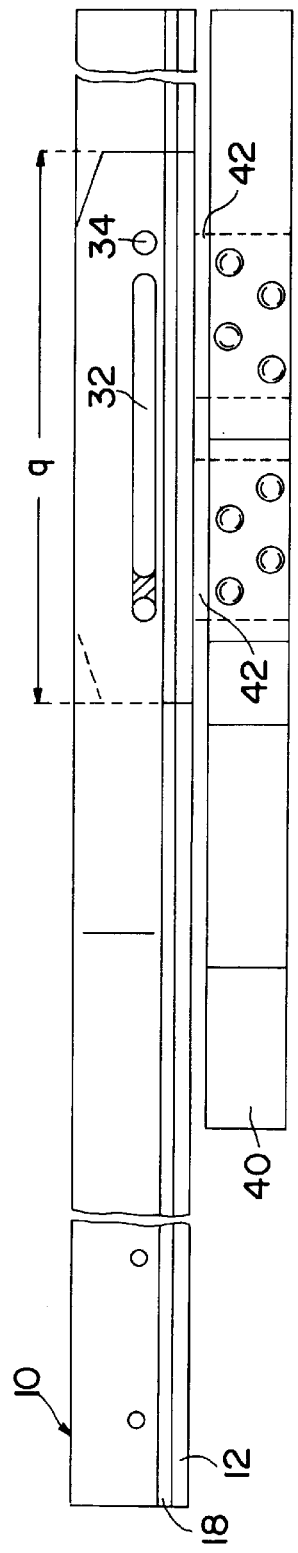

The shortest length of the expandable joint i.e. in the assembled state, is shown on FIG. 6; the bolt 36 of one rail end $10_e$ contacts the end of the slit 32 in the neighboring conductor rail 10 at its end removed from the end face 26.

In each case in FIGS. 5 and 6 flexible power conductors 40 are provided below the conductor rail ends 10 for electrical connection between the rails. The strip-shaped electrical connector 40 is in each case connected to one of the conductor rail ends $10_e$ by a displaceable cross-strip 42.

I claim:

1. A system comprising: at least two conductor metal rails, each including rail ends and a central axis; a rail-shaped metal load-bearing section of each rail, each having a matrix; at least one strip-shaped section of another metal joined to the matrix of the load-bearing section and exhibiting greater wear resistance than the load-bearing section, said strip shaped section including an intermediate portion and two end portions; at least one flexible conductor electrically connecting the ends of said two rails; wherein the conductor rail ends are bent out of the central axis and positioned parallel to said central axis a distance displaced from the central axis, with the end portion of the strip-shaped section at one of said conductor rail ends of one of said conductor rails approximately in-lined with the intermediate portion of the strip-shaped section of the other one of said conductor rails, so as to allow the conductor rail ends to move with respect to each other in an axial direction.

2. A system according to claim 1, wherein two neighboring conductor rail ends of said rails run parallel to each other.

3. A system according to claim 1, including: a base of said load-bearing section; an integral flange of said load-bearing section located at about the middle of said base; a longitudinal axis and a head of said flange; wherein the strip-shaped section is embedded in the head of the flange and runs at least one of (1) along the longitudinal axis of the flange and (2) parallel to the longitudinal axis of said flange, thereby forming a sliding contact plane; and wherein in the region of the conductor rail end said strip-shaped section is displaced a distance amounting to about the width of the flange.

4. A system according to claim 3, wherein over half of the base cross-section is removed for a distance extending from a bent part of the rail to its end face.

5. A system according to claim 4, wherein adjacent one of the conductor rail ends, each displaced in opposite directions, are laid against each other.

6. A system according to claim 5, wherein the flange has a flange axis and the rail end is provided with a slit in its flange, said slit running parallel to the flange axis, and a hole for a rod-shaped connecting element is provided in line with and beyond said slit.

7. A system according to claim 6, wherein the slit runs close to and parallel to the rail base.

8. A system according to claim 6, wherein the hole is situated between the slit and the end face of the conductor rail.

9. A system according to claim 6, wherein the connecting element in the hole of one of said rail ends is situated at the end of the slit near the end face of a neighboring one of said rails.

10. A system according to claim 6, wherein the connecting element in the hole of one of said rail ends is situated at the end of the slit remote from the end face of a neighboring one of said rails.

11. A system according to claim 6, wherein the rail end slopes at its end face forming an inclined face.

12. A system according to claim 1, wherein said electrical conductor is a strip-shaped electrical conductor connected to one of said conductor rail ends by way of a transverse facility which can slide.

13. A system according to claim 3, wherein said conductor rail includes a light metal component forming at least a part of said flange, and wherein the head part of said flange containing the strip-shaped section includes an inclined face at least on one side of a narrow or longitudinal face thereof.

14. A system according to claim 1, wherein said conductor rails are composite sections.

* * * * *